(12) United States Patent
Han et al.

(10) Patent No.: US 12,404,907 B2
(45) Date of Patent: Sep. 2, 2025

(54) DRUM BRAKE

(71) Applicant: SHIJIAZHUANG WULONG BRAKE CORPORATION, Shijiazhuang (CN)

(72) Inventors: Zhengfang Han, Shijiazhuang (CN); Wulin Han, Shijiazhuang (CN); Bo Wang, Shijiazhuang (CN); Xiangle Qiao, Shijiazhuang (CN); Yan Zhao, Shijiazhuang (CN); Dejun Cui, Shijiazhuang (CN); Guoqi Liu, Shijiazhuang (CN)

(73) Assignee: SHIJIAZHUANG WULONG BRAKE CORPORATION, Hebei (CN)

( * ) Notice: Subject to any disclaimer, the term of this patent is extended or adjusted under 35 U.S.C. 154(b) by 36 days.

(21) Appl. No.: 18/028,248

(22) PCT Filed: Mar. 11, 2022

(86) PCT No.: PCT/CN2022/080305
§ 371 (c)(1),
(2) Date: Mar. 24, 2023

(87) PCT Pub. No.: WO2022/213771
PCT Pub. Date: Oct. 13, 2022

(65) Prior Publication Data
US 2023/0375059 A1    Nov. 23, 2023

(30) Foreign Application Priority Data
Apr. 8, 2021 (CN) .......................... 202110379964.1

(51) Int. Cl.
*F16D 55/224* (2006.01)
*F16D 49/16* (2006.01)
*F16D 66/00* (2006.01)

(52) U.S. Cl.
CPC ............. *F16D 66/00* (2013.01); *F16D 49/16* (2013.01); *F16D 2066/005* (2013.01)

(58) Field of Classification Search
CPC ...... F16D 49/16; F16D 55/2245; F16D 66/00; F16D 2066/005; B61H 1/00
See application file for complete search history.

(56) References Cited

U.S. PATENT DOCUMENTS

| 4,306,637 A | 12/1981 | Keiser et al. |
| 4,805,741 A | 2/1989 | de Jong et al. |

(Continued)

FOREIGN PATENT DOCUMENTS

| CN | 2433139 Y | 6/2001 |
| CN | 103032496 A | 4/2013 |

(Continued)

OTHER PUBLICATIONS

Supplementary European Search Report for EP22 78 3840, prepared by the European Patent Office, mailing date Nov. 7, 2024, 6 pages.

(Continued)

*Primary Examiner* — Thomas W Irvin
(74) *Attorney, Agent, or Firm* — Brooks Kushman P.C.

(57) ABSTRACT

The present application relates to a drum brake, which includes a brake arm; a brake shoe; a base; and a brake torque detection device; the brake shoe is hinged on the brake arm through a brake shoe shaft, the brake arm is provided with a shaft hole penetrating through the brake shoe shaft, and the shaft hole is an oblong shaft hole, and a hole wall at one side of the oblong shaft hole is provided with a wear-resistant strip configured for pressing against the brake shoe shaft during braking of the drum brake; the brake torque detection device includes a sensing plate and a tension and compression sensor arranged on the sensing (Continued)

plate; one end of the sensing plate is connected to the brake shoe shaft, and the other end of the sensing plate is connected to the brake arm.

7 Claims, 5 Drawing Sheets

(56) References Cited

U.S. PATENT DOCUMENTS

| | | | |
|---|---|---|---|
| 6,364,076 | B1 | 4/2002 | Braun et al. |
| 10,112,812 | B2 * | 10/2018 | Han ................... B66D 5/30 |
| 10,260,578 | B2 * | 4/2019 | Suzuki ................ B61H 5/00 |
| 11,098,775 | B2 * | 8/2021 | Yano ............... F16D 55/2245 |
| 11,725,705 | B2 * | 8/2023 | Han ............... F16D 55/2245 |
| | | | 73/129 |
| 2015/0217978 | A1 * | 8/2015 | Han ................... B66D 5/08 |
| | | | 188/75 |
| 2017/0058977 | A1 * | 3/2017 | Yano ................. B61H 5/00 |
| 2017/0234377 | A1 * | 8/2017 | Suzuki ............. F16D 65/183 |
| | | | 188/72.3 |
| 2022/0412419 | A1 * | 12/2022 | Han ................... F16D 66/00 |
| 2023/0375059 | A1 | 11/2023 | Han |

FOREIGN PATENT DOCUMENTS

| | | |
|---|---|---|
| CN | 103786744 A | 5/2014 |
| CN | 205343860 U | 6/2016 |
| CN | 108373089 A | 8/2018 |
| CN | 208103623 U | 11/2018 |
| CN | 208895945 U | 5/2019 |
| CN | 210533594 U | 5/2020 |
| CN | 111521318 A | 8/2020 |
| CN | 211765569 U | 10/2020 |
| CN | 211954529 U | 11/2020 |
| CN | 212450152 U | 2/2021 |
| CN | 113202893 A | 8/2021 |
| CN | 215257536 U | 12/2021 |

OTHER PUBLICATIONS

Chinese Initial Search Report for CN 2021103799641, prepared by the Chinese Patent Office, mailing date Aug. 19, 2024, 4 pages.

* cited by examiner

DRUM BRAKE

CROSS-REFERENCE TO RELATED APPLICATION

The present application is a National Stage Application of International Patent Application No. PCT/CN2022/080305, filed on Mar. 11, 2022, which claims priority to and benefits of Chinese Patent Application No. 202110379964.1, filed on Apr. 8, 2021. The entire contents of all of the aforementioned application, including any intervening amendments thereto, are incorporated herein by reference for all purposes. No new matter has been introduced.

TECHNICAL FIELD

The present application relates to an electromagnetic brake, and more particularly to a drum brake.

BACKGROUND

The brake torque detection device mounted on the existing brake is to add a pressure sensor to detect the working pressure of the brake spring in the spring box where the brake spring is mounted. By multiplying the detected pressure value by the friction coefficient between the brake drum and the brake disc, the magnitude of the friction force applied by the brake drum on the brake disc can be obtained, then the brake torque of the brake can be calculated combining with the radius of the brake disc. Since the brake torque is calculated based on the friction coefficient as a constant value, when the brake disc is immersed with oil and water or the brake disc is overheated, the friction coefficient between the brake drum and the brake disc is changed. However, the change cannot be accurately reflected by the brake torque detection device. Therefore, when in a specific situation, the detection result of the existing brake torque detection device is inconsistent with the actual value.

The applicant's previously filed Patent No. ZL20182056157.1 entitled "a brake torque true value detection sensor of a hub brake" provides a feasible technical solution for detecting brake torque. However, the disadvantage of the technical solution is that the hardness of the brake arm cannot be effectively improved because the brake arm cannot be quenched due to its high toughness requirements. In the case of repeated application of force to the brake shoe shaft due to frequent braking, which results in an indentation groove appeared on the hole wall of the oblong shaft hole penetrating through the brake shoe shaft on the brake arm. Once the indentation groove is formed, which inhibits the tiny movement of the brake shoe shaft along the length direction of the brake arm. As a result, the measured data of tangential braking displacement of the brake shoe based on the tiny movement appear a larger distortion, and the measured data of the brake torque appear a larger deviation.

SUMMARY

An object of the present application is to provide a drum brake to solve the problem of detection data distortion caused by the indentation groove on the hole wall of the brake arm shaft hole existing in the existing brake torque detection device.

The present application is realized by providing a drum brake, which includes: a brake arm; a brake shoe; a base; and a brake torque detection device; the brake shoe is hinged on the brake arm through a brake shoe shaft, the brake arm is provided with a shaft hole penetrating through the brake shoe shaft, and the shaft hole is an oblong shaft hole, and a hole wall at one side of the oblong shaft hole is provided with a wear-resistant strip configured for pressing against the brake shoe shaft during braking of the drum brake; the brake torque detection device includes a sensing plate and a tension and compression sensor arranged on the sensing plate; one end of the sensing plate is connected to the brake shoe shaft, and the other end of the sensing plate is connected to the brake arm.

In an embodiment, the sensing plate is vertically arranged, one end of the sensing plate is provided with a hole and is connected to the brake arm through a connection shaft, and the other end of the sensing plate is provided with a closed hole or a groove, the brake shoe shaft passes through the closed hole or the groove, and an axle center of the brake shoe shaft is located at a center position along a length direction of the oblong shaft hole under a static state.

In an embodiment, a shaft sleeve is sleeved on the brake shoe shaft, and the shaft sleeve is attached to the wear-resistant strip.

When the brake drum on device is clamped by the brake shoe of the drum brake to performing braking, the friction force between the brake shoe and the brake drum is used to achieve friction braking. The magnitude of the brake torque actually reflects the magnitude of above friction force. When the brake is braking, the brake shoe drives the brake shoe shaft to move an appropriate amount of tiny displacement in the oblong shaft hole of the brake arm. The direction of the displacement is consistent with the direction of the friction force generated by the brake shoe applying positive pressure, and the magnitude of the displacement is in direct proportion to the magnitude of the friction force. Therefore, the displacement of the brake shoe shaft in the oblong shaft hole of the brake arm can be detected by providing the sensing plate and the tension and compression sensor, and the displacement can be converted into the detection data that can reflect the magnitude of the friction force, thus the real-time detection of the braking friction force is realized; further in combination with the radius of the brake drum of the device (that is, the action arm of the friction force), the brake torque of the brake can be detected. Therefore, the sensing plate and tension and compression sensor mounted in the brake constitute a brake torque detection device.

In the present application, the shaft hole of the brake shoe shaft on the brake arm is arranged into a vertical oblong shaft hole, and with the stable connection between the brake shoe shaft and sensing plate, the brake arm enables the suspension connection between the brake shoe shaft and the brake arm through the sensing plate. In this way, when the brake is braking, the brake shoe shaft can generate a displacement that changes with the change of the magnitude of the braking friction force; the sensing plate can sense the displacement well and convert the braking displacement to the plate deformation of the sensing plate, and then the tension and compression sensor converts the plate deformation to the electrical signal of the applied force, and then the electrical signal is sent to the external, thus the real-time detection of the braking friction force of the brake is realized, and further the real-time detection of the brake torque is realized.

In the present application, the wear-resistant strip is added to the oblong shaft hole of the brake arm, or the wear-resistant strip is added to the brake arm through the support plate, therefore, the brake arm can apply positive braking pressure to the brake shoe shaft through the wear-resistant strip during braking. The wear-resistant strip can be quenched and the hardness of which can meet the use requirements. Therefore, the braking displacement of the brake shoe shaft in the oblong shaft hole will not generate the indentation groove on the wear-resistant strip, thus, the adverse effect of the indentation groove on the braking displacement of the brake shoe shaft is eliminated, and the detection deviation of the brake torque is correspondingly reduced.

In addition, the shaft sleeve is mounted onto the brake shoe shaft, the sliding displacement of the brake shoe shaft in the oblong shaft hole of the brake arm is converted into the rolling displacement of the shaft sleeve on the wear-resistant strip, and the sliding friction is converted into the rolling friction. In this way, the friction force generated by the brake shoe shaft relative to the braking displacement of the wear-resistant strip due to the brake positive pressure applying on the brake shoe shaft is reduced due to the significant reduction of the friction coefficient, and the friction force is far less than the braking friction force generated by the braking of the brake, thus the adverse effect on the braking friction force of the brake due to the existence of the friction force is reduced, and the detection accuracy of the brake torque detection device on the braking friction force and brake torque of the brake are effectively improved.

The present application can further be realized by providing a drum brake, which includes: a brake arm; a brake shoe; a base; and a brake torque detection device; the brake shoe is hinged on the brake arm through a brake shoe shaft; the brake arm is provided with a shaft hole penetrating through the brake shoe shaft, and the shaft hole is an oblong shaft hole; the brake arm is provided with a support plate, and a surface of the support plate is provided with a through hole, a hole diameter of the oblong shaft hole is within a diameter range of the through hole, and a hole edge of the through hole on the support plate is provided with a wear-resistant strip that presses against the brake shoe shaft during braking of the drum brake; the brake torque detection device includes a sensing plate and a tension and compression sensor arranged on the sensing plate; one end of the sensing plate is connected to the brake shoe shaft, and the other end of the sensing plate is connected to the brake arm.

In an embodiment, the sensing plate is vertically arranged, one end of the sensing plate is provided with a hole and is connected to the brake arm through a connection shaft, and the other end of the sensing plate is provided with a closed hole or a groove, the brake shoe shaft passes through the closed hole or the groove, and an axle center of the brake shoe shaft is located at a center position along a length direction of the oblong shaft hole under a static state.

In an embodiment, a shaft sleeve is sleeved on the brake shoe shaft, and the shaft sleeve is attached to the wear-resistant strip.

In an embodiment, an outer surface of the support plate is provided with a fixing sheet to block the wear-resistant strip.

The present application can further be realized by providing a drum brake, which includes: a brake arm; a brake shoe; a base; and a brake torque detection device; the brake arm is hinged on the base through an articulated shaft, the brake arm is provided with a shaft hole penetrating the articulated shaft, and the shaft hole is an oblong shaft hole; a hole wall at one side of the oblong shaft hole is provided with a wear-resistant strip configured for pressing against the articulated shaft during braking of the drum brake; the brake torque detection device includes a sensing plate and a tension and compression sensor arranged on the sensing plate; a lower end of the sensing plate is connected to the articulated shaft, and an upper end of the sensing plate is connected to the brake arm.

In an embodiment, a shaft sleeve is sleeved on the articulated shaft, and the shaft sleeve is attached to the wear-resistant strip.

The present application can further be realized by providing a drum brake, which includes: a brake arm; a brake shoe; a base; and a brake torque detection device; the brake arm is hinged on the base through an articulated shaft, the brake arm is provided with a shaft hole penetrating the articulated shaft, and the shaft hole is an oblong shaft hole; the brake arm is provided with a support plate, and a surface of the support plate is provided with a through hole, a hole diameter of the oblong shaft hole is within a diameter range of the through hole, and a hole edge of the through hole on the support plate is provided with a wear-resistant strip that presses against the articulated shaft during braking of the drum brake; the brake torque detection device includes a sensing plate and a tension and compression sensor arranged on the sensing plate; a lower end of the sensing plate is connected to the articulated shaft, and an upper end of the sensing plate is connected to the brake arm.

In an embodiment, a shaft sleeve is sleeved on the articulated shaft, and the shaft sleeve is attached to the wear-resistant strip.

The last two implementations are to add the wear-resistant strip on the shaft hole of the articulated shaft at the base of the brake arm, or add the wear-resistant strip on the brake arm through the support plate, so as to eliminate the indentation grooves formed on the oblong shaft hole due to the braking displacement of the articulated shaft, and correspondingly reduce the detection deviation of the brake torque. Similarly, by mounting a shaft sleeve on the articulated shaft, the sliding displacement of the articulated shaft in the oblong shaft hole of the brake arm during braking of the brake is converted into the rolling displacement of the shaft sleeve on the wear-resistant strip, and the sliding friction is converted into the rolling friction, so as to reduce the adverse effect of the braking displacement friction force of the articulated shaft on the braking friction force of the brake. Thus, the detection accuracy of the braking friction force and brake torque of the brake torque detection device are effectively improved.

In the drawings, the reference numerals corresponding to the technical features are listed as following:

1—brake arm; 2—brake shoe shaft; 3—shaft hole; 4—sensing plate; 5—closed hole; 6—groove; 7—tension and compression sensor; 8—brake shoe; 9—connection shaft; 10—brake drum; 11—support plate; 13—wear-resistant strip; 15—shaft sleeve; 16—fixing sheet; 17—base; 18—articulated shaft.

DETAILED DESCRIPTION OF EMBODIMENTS

Figure 1:
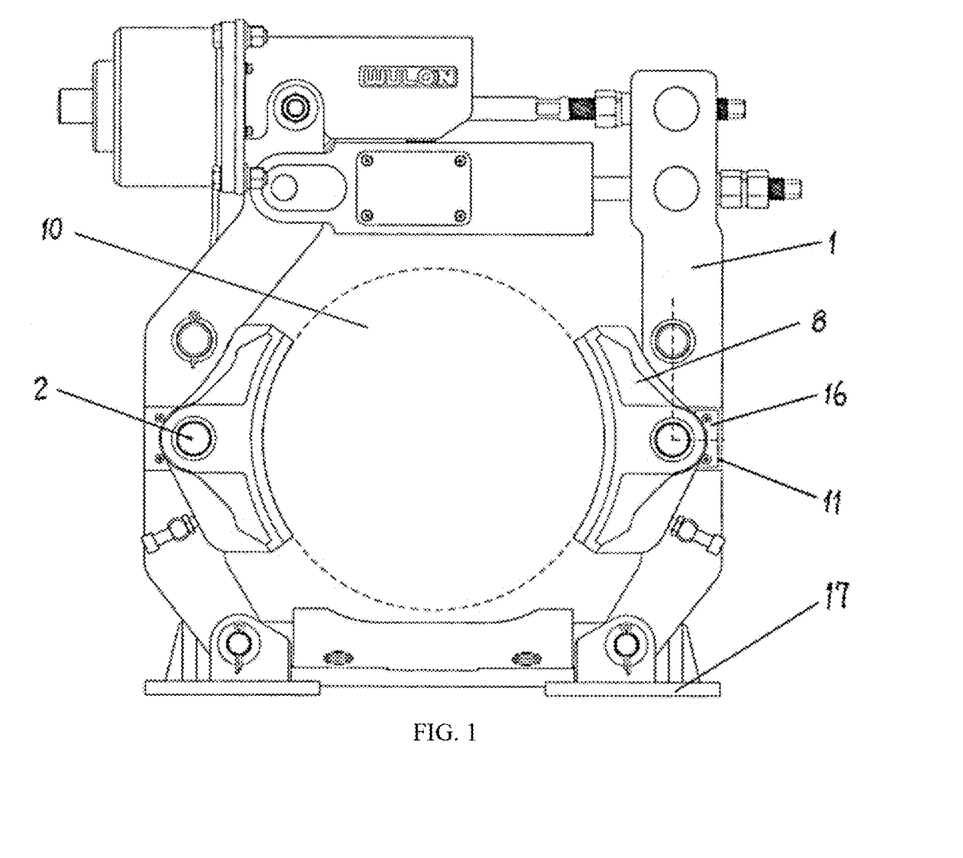
FIG. 1 is a schematic view of external structure of a product in Embodiment 1 and Embodiment 2.
Figure 2:
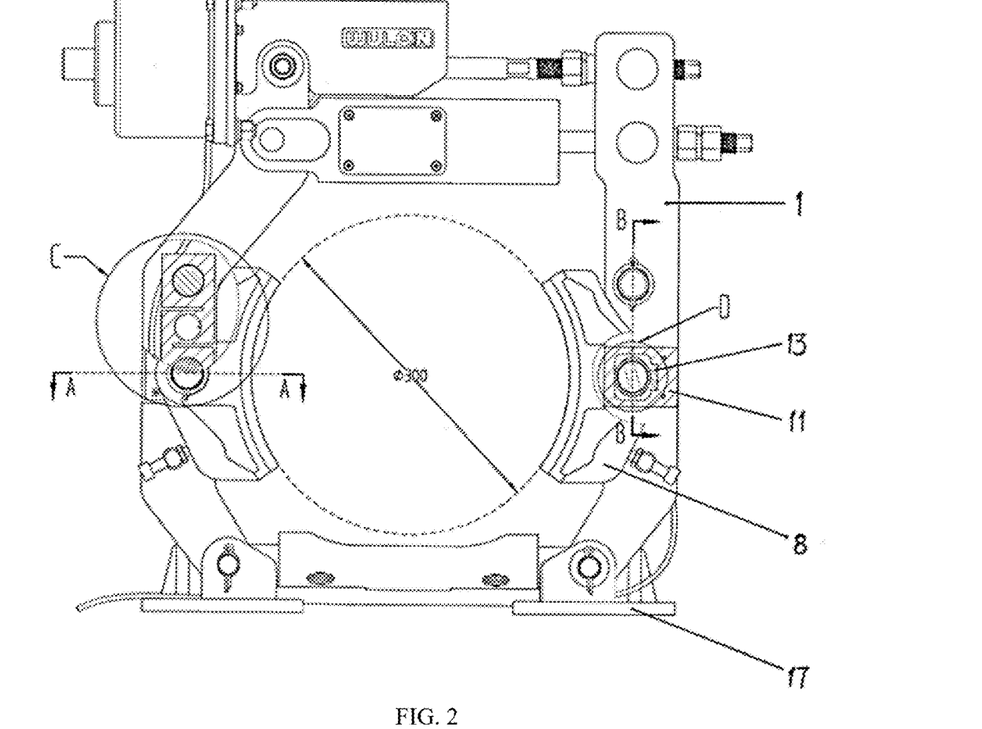
FIG. 2 is a structural schematic view of Embodiment 2.

As shown in FIGS. 1 and 2, the conventional drum brake includes a brake arm 1, a brake shoe 8, a base 17, and so on. The lower end of the brake arm 1 is connected to the base 17 through an articulated shaft 18, and the upper end is connected to a brake pull rod, a brake spring, a brake electromagnet and so on. The middle of two brake arms 1 are provided with shaft holes 3 (FIG. 9) respectively, one brake shoe shaft 2 is penetrated through each shaft hole 3 to hinge the brake shoe 8. The brake shoes 8 connected on the two brake arms are arranged opposite to each other, and the brake drum 10 mounted on the device is clamped between the brake shoes 8.

The drum brake of the present application is formed by slightly changing the conventional drum brake and mounting a brake torque detection device. The brake torque detection device includes a sensing plate 4 and a tension and compression sensor arranged on the sensing plate 4.

Embodiment 1

Figure 9:
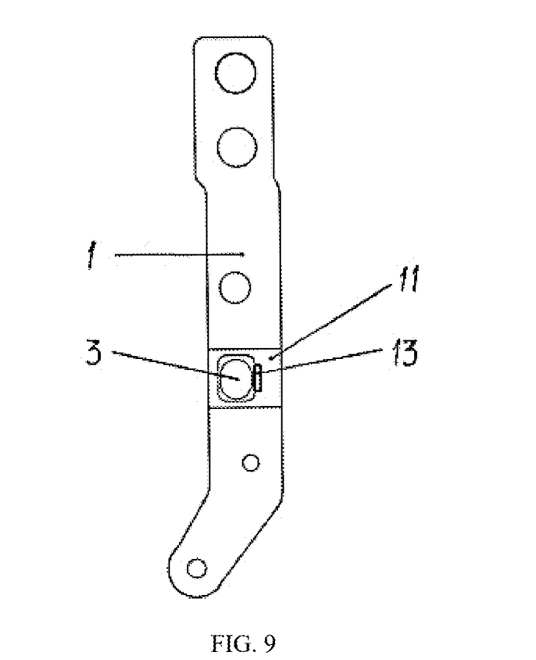
FIG. 9 is a structural schematic view of a brake arm.

As shown in FIG. 9, the specific structure of the brake arm 1 in the embodiment is that the shaft hole 3 for the brake shoe shaft to penetrate through is provided on the brake arm body is a vertical oblong shaft hole, and a wear-resistant strip 13 is arranged on one side of the hole wall of the oblong shaft hole. The side where the wear-resistant strip 13 is arranged is the side that can press and push the brake shoe shaft when the brake is braking.

Figure 4:
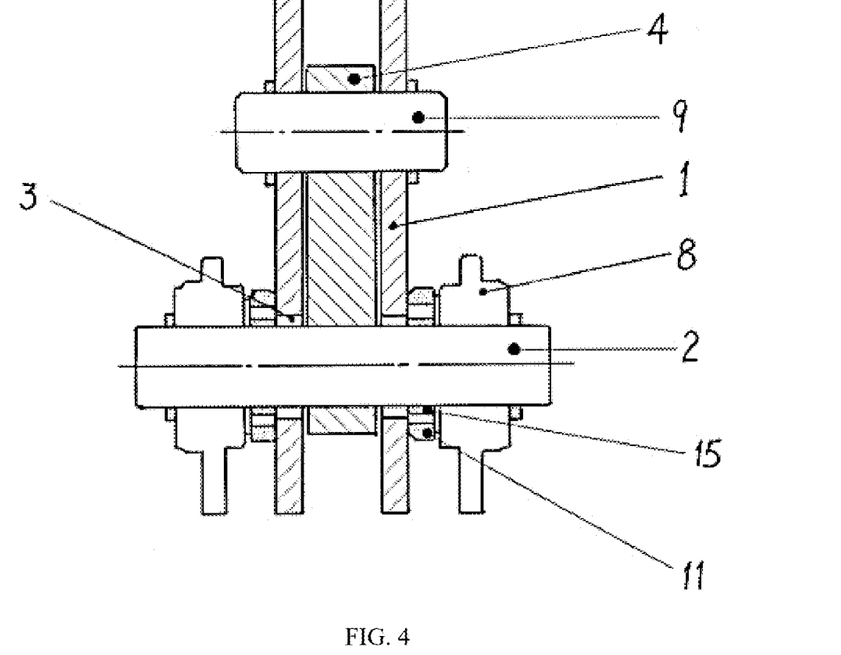
FIG. 4 is a partially sectional view of a drum brake shown in FIG. 2 along B-B direction.

As shown in FIGS. 2 and 4, the sensing plate 4 in the brake torque detection device is vertically arranged, the lower end of the sensing plate 4 is connected to the brake shoe shaft 2, and the upper end of the sensing plate 4 is hung to the brake arm 1 through the connection shaft 9.

Figure 3:
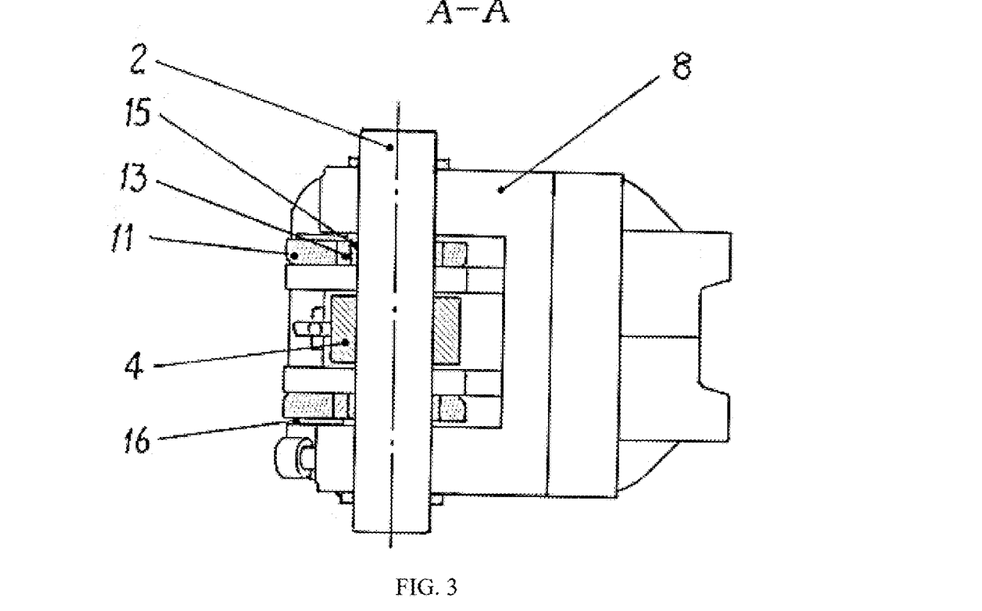
FIG. 3 is a partially sectional view of a drum brake shown in FIG. 2 along A-A direction.
Figure 5:
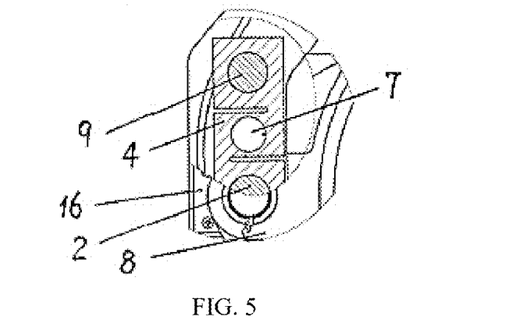
FIG. 5 is a partially enlarged view of position C of a drum brake shown in FIG. 2.

As shown in FIGS. 3, 4 and 5, a shaft sleeve 15 is sleeved on the brake shoe shaft 2, which is in a sliding fit with the brake shoe shaft 2 and attaches to an exposed surface of the wear-resistant strip 13 in the shaft hole 3.

Embodiment 2

As shown in FIG. 9, the specific structure of the brake arm 1 in the embodiment is that the shaft hole 3 for the brake shoe shaft to penetrate through is provided on the brake arm body is a vertical oblong shaft hole, the front and rear outer surfaces of the brake arm body are respectively fixed with support plates 11, the surfaces of the support plates 11 are respectively provided with a through hole (FIG. 6), the diameter of the oblong shaft hole on the brake arm 1 is within the diameter range of the through hole, and an inner edge of an hole edge on one side of the through hole is provided with a wear-resistant strip 13, and the side where the wear-resistant strip 13 is arranged is the side that can press and push the brake shoe shaft when the brake is braking. A thickness of the wear-resistant strip 13 can be the same as that of the support plate 11, and an outer side surface of the wear-resistant strip 13 is flush with the outer surface of the support plate 11 (FIG. 3), and a length direction of the wear-resistant strip 13 is consistent with a length direction of the oblong shaft hole 3. The outer surface of the support plate 11 is provided with a fixing sheet 16 (FIG. 3) configured for blocking the wear-resistant strip.

In the embodiment, the brake arm 1 with the above structure is used and a brake torque detection device is added to the brake.

As shown in FIGS. 2 and 4, the sensing plate 4 in the brake torque detection device is vertically arranged, the lower end of the sensing plate 4 is connected to the brake shoe shaft 2, and the upper end of the sensing plate 4 is hung to the brake arm 1 through the connection shaft 9. As shown in FIGS. 3, 4 and 5, a shaft sleeve 15 is sleeved on the brake shoe shaft 2, which is in a sliding fit with the brake shoe shaft 2, and the shaft sleeve 15 is arranged to be opposite to the wear-resistant strip 13, so as to be attached on the wear-resistant strip 13.

Figure 7:
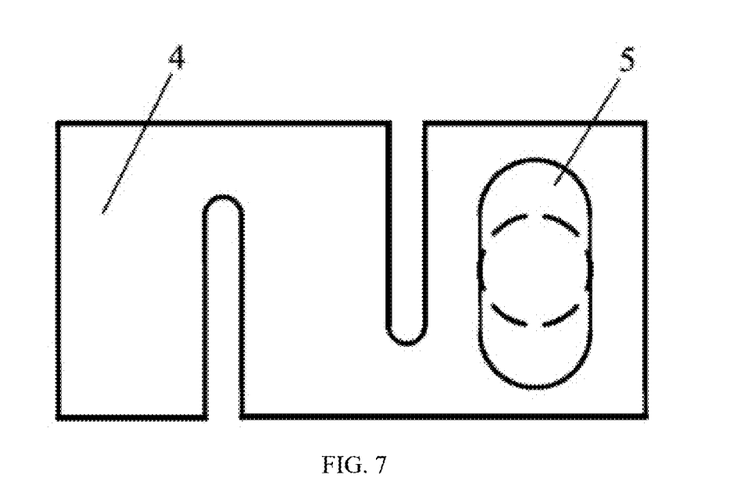
FIGS. 7 and 8 are two structural schematic views of a sensing plate.
Figure 8:
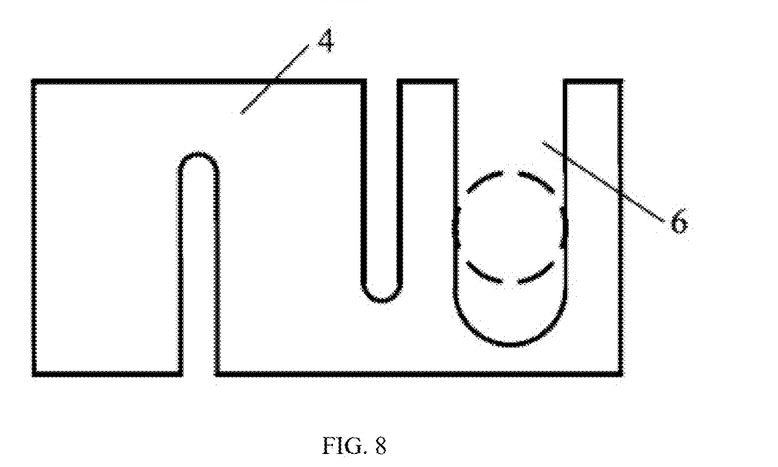

As shown in FIGS. 7 and 8, the specific structure of the sensing plate 4 is a rectangular plate, and a surface of the rectangular plate is provided with two slits along the long side thereof, and the two slits are parallel to the short side thereof, and the opening directions of the two slits are opposite, so that the surface of the sensing plate is divided into three relatively independent and sequentially connected parts, such that the sensing plate 4 forms an S-shaped plate with a rectangular outline. The plate body of the sensing plate 4 is provided with a closed hole 5 (FIG. 7) or a groove 6 (FIG. 8) to sleeve the brake shoe shaft. The closed hole 5 can be a round hole with a diameter slightly greater than the diameter of the brake shoe shaft, or a oblong hole with a circle radius slightly greater than the radius of the brake shoe shaft. The long direction of the oblong hole is perpendicular to the long direction of the oblong shaft hole 3 of the brake arm after the sensing plate 4 is mounted on the brake arm 1, so as to eliminate the transverse displacement component of the brake shoe shaft during braking, thus the transverse displacement component of the brake shoe shaft along the braking tangential direction is obtained, which provides a basis for the detection of the braking friction force and brake torque. The tension and compression sensor 7 is fixed at the middle position (FIG. 5) on the surface of the sensing plate, which is the best position for the sensing plate to produce plate deformation.

As shown in FIG. 4, the sensing plate 4 is hung in the middle gap between the brake arms 1 through the connection shaft 9, and the center line of the sensing plate 4 along the length direction of the sensing plate 4 and the center line of the oblong shaft hole 3 on the brake arm 1 along the length direction of the oblong shaft hole 3 are on a vertical plane (FIG. 2).

As shown in FIGS. 2 and 4, the sensing plate 4 is vertically arranged, the upper end of the sensing plate 4 is hung in the middle gap between the brake arms 1, and the lower end of the sensing plate 4 is sleeved on the brake shoe shaft 2 through the closed hole 5 or the groove 6, so that the axis of the brake shoe shaft 2 is located at a central position of the shaft hole 3 on the brake arm 1 along the length direction of the shaft hole 3 when the brake shoe shaft 2 is in a static state. In this way, a stable support connection relationship can be formed between the brake shoe shaft 2 and the brake arm 1 through the sensing plate 4 in the brake torque detection device, and a suspension connection can be realized between the brake shoe shaft 2 and the brake arm 1. The center line of the sensing plate 4 along the length direction of the sensing plate 4 and the center line of the shaft hole 3 on the brake arm 1 along the length direction of the shaft hole 3 are on a vertical plane, so as to better ensure the detection accuracy.

When the brake is braking, the brake shoe shaft 2 generates braking displacement in the shaft hole 3 of the brake arm 1 and the closed hole 5 of the sensing plate 4. The braking displacement can be divided into lateral displacement and longitudinal displacement, and the lateral displacement is eliminated by the oblong closed hole 5 (or the groove 6) of the sensing plate 4, while the longitudinal displacement is eliminated by the oblong shaft hole of the brake arm 1. Thus, when the brake is braking, the brake shoe shaft 2 can generate displacement changing with the braking friction force along the long direction of the brake arm 1. In the process of eliminating the longitudinal displacement, the corresponding plate deformation will occur on the sensing plate 4. Since the tension and compression sensor 7 is fixed at a sensitive part in the middle of the surface of the sensing plate 4, the plate body deformation generated by the braking force applied on the sensing plate 4 can be converted into force information, and the force information can be sent to the external in the form of electrical signals or digital signals. The force information can be regarded as the friction force generated when the brake is braking, and the product of the braking friction force and the radius of the brake drum (i.e. the acting arm of the friction force) is the true value of the brake torque of the drum brake.

Embodiment 3

Figure 10:
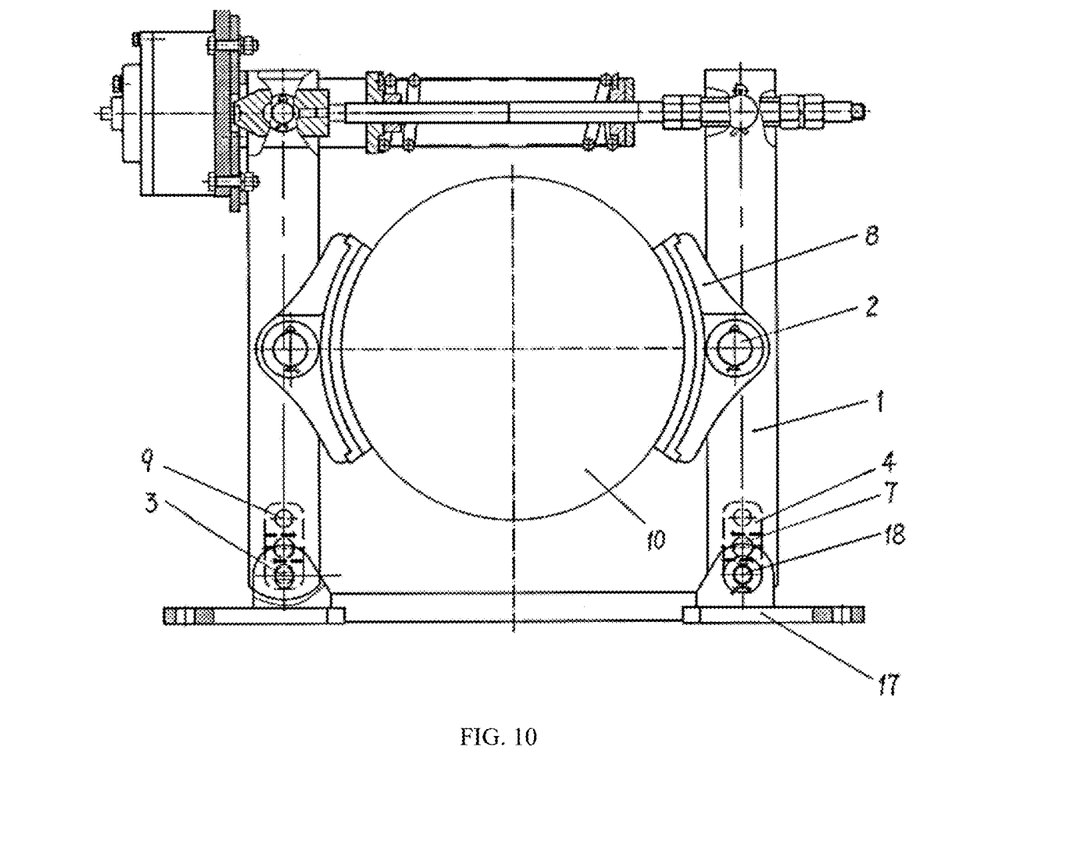
FIG. 10 is a schematic view of external structure of a product in Embodiment 3 and Embodiment 4.

As shown in FIG. 10, the brake structure of the embodiment is basically the same as that of Embodiment 1, the main difference is that the shaft hole hinged with the base 17 on the brake arm 1 is changed into a vertical oblong shaft hole, and a wear-resistant strip 13 is arranged on the hole wall at one side of the oblong shaft hole, and the side where the wear-resistant strip 13 is arranged is the side that press against the articulated shaft 18 when the brake is braking. The brake torque detection device includes a sensing plate 4 and a tension and compression sensor 7 arranged on the sensing plate 4. The lower end of the sensing plate 4 is connected to the articulated shaft 18, and the upper end of the sensing plate 4 is connected to the brake arm 1. The working mode and principle of the brake torque detection device are the same as those in Embodiment 1.

A shaft sleeve 15 is sleeved on the articulated shaft 18 that is penetrated through the base 17. The shaft sleeve 15 is in a sliding fit with the articulated shaft 17, and is attached on the exposed surface of the wear-resistant strip 13 in the shaft hole.

Embodiment 4

Figure 6:
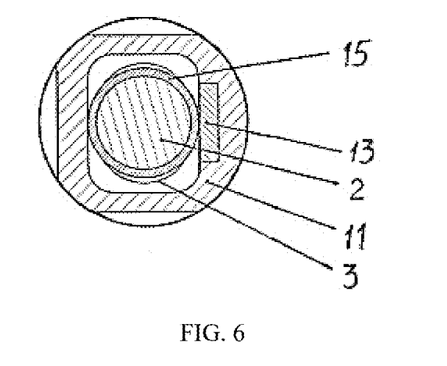
FIG. 6 is a partially enlarged view of position D of a drum brake shown in FIG. 2.

As shown in FIG. 10, the brake structure of the embodiment is basically the same as that of Embodiment 2, the main difference is that the shaft hole hinged with the base 17 on the brake arm 1 is changed into a vertical oblong shaft hole. As shown in FIG. 6, an outer side surface of the brake arm 1 relative to the oblong shaft hole is fixed with support plates 11, and the surfaces of the support plates 11 are respectively provided with a through hole (FIG. 6), the diameter of the oblong shaft hole on the brake arm 1 is within the diameter range of the through hole, and an inner edge of an hole edge on one side of the through hole is provided with a wear-resistant strip 13, and the side where the wear-resistant strip 13 is arranged is the side that can press against the articulated shaft 18 when the brake is braking. A thickness of the wear-resistant strip 13 can be the same as that of the support plate 11, and an outer side surface of the wear-resistant strip 13 is flush with the outer surface of the support plate 11 (FIG. 3), and a length direction of the wear-resistant strip 13 is consistent with a length direction of the oblong shaft hole 3. The outer surface of the support plate 11 is provided with a fixing sheet 16 (FIG. 3) configured for blocking the wear-resistant strip.

As shown in FIG. 5, a shaft sleeve 15 is sleeved on the articulated shaft 18 that is penetrated through the base 17, which is in a sliding fit with the articulated shaft 18, and the shaft sleeve 15 is arranged to be opposite to the articulated shaft 18, so as to be attached on the wear-resistant strip 13.

The brake torque detection device used in the embodiment is the same as that in Embodiment 2, except that the sensing plate 4 is mounted between the brake arm 1 and the articulated shaft 18 that is penetrated through the base to detect the brake torque in a real-time. The working principle is that the brake arm 1 is suspended to the articulated shaft 18 through the sensing plate 4. When the brake shoe 8 brakes the brake drum 10, the longitudinal tension generated by the brake arm 1 driven by the braking friction force is detected by the sensing plate 1, and the braking friction force is detected by the tension and compression sensor 7. The real-time detection data of the brake torque can be obtained by combining the action arm (radius of the brake drum) of the braking friction force.

What is claimed is:

1. A drum brake, comprising:
    a brake arm;
    a brake shoe, hinged on the brake arm through a brake shoe shaft;
    a base; and
    a brake torque detection device;
    wherein the brake arm is provided with a shaft hole penetrating through the brake shoe shaft, and the shaft hole is an oblong shaft hole, and a hole wall at one side of the oblong shaft hole is provided with a wear-resistant strip configured for pressing against the brake shoe shaft during braking of the drum brake; the brake torque detection device comprises a sensing plate and a tension and compression sensor arranged on the sensing plate; one end of the sensing plate is connected to the brake shoe shaft, and the other end of the sensing plate is connected to the brake arm; and
    wherein a shaft sleeve is slidably sleeved on the brake shoe shaft, and the shaft sleeve is attached to the wear-resistant strip.

2. The drum brake according to claim 1, wherein the sensing plate is vertically arranged, one end of the sensing plate is provided with a hole and is connected to the brake arm through a connection shaft, and the other end of the sensing plate is provided with a closed hole or a groove, the brake shoe shaft passes through the closed hole or the groove, and an axle center of the brake shoe shaft is located at a center position along a length direction of the oblong shaft hole under a static state.

3. A drum brake, comprising:
    a brake arm;
    a brake shoe, hinged on the brake arm through a brake shoe shaft;
    a base; and
    a brake torque detection device;
    wherein the brake arm is provided with a shaft hole penetrating through the brake shoe shaft, and the shaft hole is an oblong shaft hole; the brake arm is provided with a support plate, and a plate surface of the support plate is provided with a through hole, a hole diameter of the oblong shaft hole is within a diameter range of the through hole, and a hole edge of the through hole on the support plate is provided with a wear-resistant strip that presses against the brake shoe shaft during braking of the drum brake; the brake torque detection device comprises a sensing plate and a tension and compression sensor arranged on the sensing plate; one end of the sensing plate is connected to the brake shoe shaft, and the other end of the sensing plate is connected to the brake arm; and wherein a shaft sleeve is slidably sleeved on the brake shoe shaft, and the shaft sleeve is attached to the wear-resistant strip.

4. The drum brake according to claim 3, wherein the sensing plate is vertically arranged, one end of the sensing plate is provided with a hole and is connected to the brake arm through a connection shaft, and the other end of the sensing plate is provided with a closed hole or a groove, the brake shoe shaft passes through the closed hole or the groove, and an axle center of the brake shoe shaft is located at a center position along a length direction of the oblong shaft hole under a static state.

5. The drum brake according to claim 3, wherein an outer surface of the support plate is provided with a fixing sheet configured to block the wear-resistant strip.

6. The drum brake according to claim 3, wherein the brake arm is hinged on the base through an articulated shaft, a lower end of the sensing plate is connected to the articulated shaft, and an upper end of the sensing plate is connected to the brake arm.

7. A drum brake, comprising:
a brake arm;
a brake shoe;
a base; and
a brake torque detection device;
wherein the brake arm is hinged on the base through an articulated shaft, the brake arm is provided with a shaft hole penetrating the articulated shaft, and the shaft hole is an oblong shaft hole; a hole wall at one side of the oblong shaft hole is provided with a wear-resistant strip configured for pressing against the articulated shaft during braking of the drum brake; the brake torque detection device comprises a sensing plate and a tension and compression sensor arranged on the sensing plate; a lower end of the sensing plate is connected to the articulated shaft, and an upper end of the sensing plate is connected to the brake arm; and wherein a shaft sleeve is slidably sleeved on the brake shoe shaft, and the shaft sleeve is attached to the wear-resistant strip.

* * * * *